United States Patent
Araki et al.

(10) Patent No.: US 10,571,962 B2
(45) Date of Patent: Feb. 25, 2020

(54) MOBILE TERMINAL WITH FLEXIBLE DISPLAY

(71) Applicant: Sharp Kabushiki Kaisha, Sakai, Osaka (JP)

(72) Inventors: Ryoh Araki, Sakai (JP); Tsuyoshi Kawaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/462,273

(22) PCT Filed: Apr. 28, 2017

(86) PCT No.: PCT/JP2017/016901
§ 371 (c)(1),
(2) Date: May 20, 2019

(87) PCT Pub. No.: WO2018/198307
PCT Pub. Date: Nov. 1, 2018

(65) Prior Publication Data
US 2019/0354138 A1 Nov. 21, 2019

(51) Int. Cl.
*G06F 1/16* (2006.01)
*H04M 1/02* (2006.01)

(52) U.S. Cl.
CPC .......... *G06F 1/1616* (2013.01); *G06F 1/1652* (2013.01); *H04M 1/0247* (2013.01)

(58) Field of Classification Search
CPC ........ G06F 1/1616; G06F 1/1652; G06F 1/16; H04M 1/0247; H04M 1/02; G09F 9/00
See application file for complete search history.

(56) References Cited

U.S. PATENT DOCUMENTS

| | | | |
|---|---|---|---|
| 6,377,324 B1 | 4/2002 | Katsura | |
| 2006/0050169 A1 | 3/2006 | Misawa | |
| 2011/0148797 A1 | 6/2011 | Huitema et al. | |
| 2012/0044620 A1* | 2/2012 | Song | G06F 1/1616 361/679.01 |
| 2013/0021762 A1* | 1/2013 | van Dijk | G06F 1/1652 361/749 |
| 2013/0037228 A1* | 2/2013 | Verschoor | G06F 1/1652 160/377 |
| 2014/0042293 A1* | 2/2014 | Mok | G09F 9/301 248/682 |
| 2015/0055286 A1 | 2/2015 | Eguchi | |

(Continued)

FOREIGN PATENT DOCUMENTS

| | | |
|---|---|---|
| JP | 2006-072115 A | 3/2006 |
| JP | 2011-112891 A | 6/2011 |

(Continued)

OTHER PUBLICATIONS

Official Communication issued in International Patent Application No. PCT/JP2017/016901, dated Aug. 8, 2017.

*Primary Examiner* — Abhishek M Rathod
(74) *Attorney, Agent, or Firm* — Keating & Bennett, LLP

(57) ABSTRACT

In a mobile terminal, a second housing includes a second hinge configured to fit together with a first hinge to allow a flexible display to fold between a first housing and the second housing. The first housing includes a cutout portion configured to form a space for permitting elastic deformation of a bending portion of the flexible display that is folded.

18 Claims, 12 Drawing Sheets

(56) References Cited

U.S. PATENT DOCUMENTS

| | | | | |
|---|---|---|---|---|
| 2015/0330614 A1* | 11/2015 | Lee | ......................... | G09F 9/301 |
| | | | | 362/97.1 |
| 2016/0334836 A1* | 11/2016 | Hong | .................... | G06F 1/1616 |
| 2016/0366772 A1 | 12/2016 | Choi et al. | | |
| 2017/0201607 A1* | 7/2017 | Xu | ...................... | H04M 1/0268 |
| 2017/0374749 A1* | 12/2017 | Lee | .................... | E05D 11/0054 |

FOREIGN PATENT DOCUMENTS

| JP | 2011-518391 A | 6/2011 |
|---|---|---|
| JP | 2015-062059 A | 4/2015 |
| WO | 99/34348 A1 | 7/1999 |

\* cited by examiner

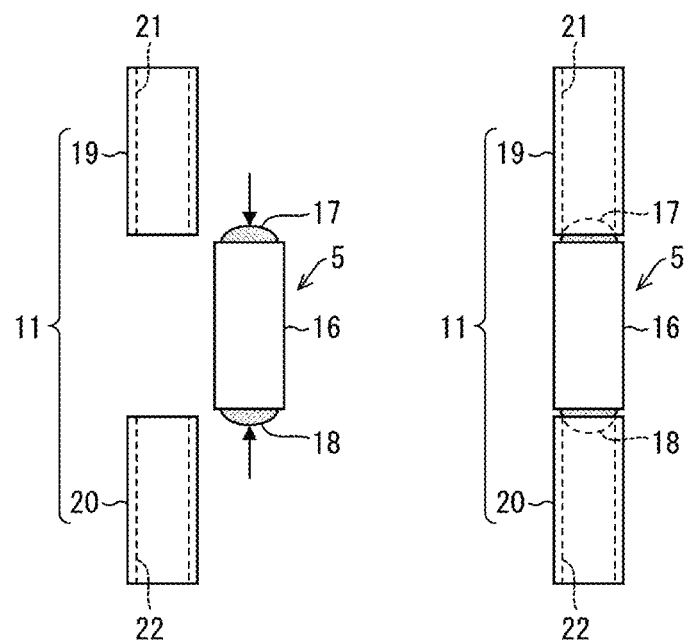

MOBILE TERMINAL WITH FLEXIBLE DISPLAY

TECHNICAL FIELD

The disclosure relates to a mobile terminal with a flexible display, the flexible display having a foldable configuration.

BACKGROUND ART

In the related art, there are known display devices that include a flexible display having a foldable configuration (PTL 1). Such a display device includes a flexible display fixed to a first fixing portion at one end and fixed to a second fixing portion at the other end, and a member having a flexible configuration and fixed to the first fixing portion at one end and connected to a roll-up portion fixed to the second fixing portion at the other end. The roll-up portion has a function of allowing the member to be rolled up from the other end of the member. The flexible display is bent and folded by rolling up the member on the roll-up portion. Then, the flexible display is unfolded by pulling out the rolled-up member from the roll-up portion.

CITATION LIST

Patent Literature

PTL 1: JP 2015-62059 A (published Apr. 2, 2015)

SUMMARY

Technical Problem

Recently, there has been increasing demand for a mobile terminal provided with a foldable flexible display. Conceivable configurations of such a mobile terminal include a mobile terminal provided with a first housing having a plate shape with one end side of a flexible display fixed thereto, and a second housing having a plate shape with the other end side of the flexible display fixed thereto. The second housing is provided with a second hinge that fits together with a first hinge provided to the first housing. The second housing is rotated about a hinge shaft in which the first hinge is fitted together with the second hinge, folding the flexible display between the first housing and the second housing.

Nevertheless, a bending radius of the bending portion of the flexible display folded between the first housing and the second housing is extremely small, resulting in the possibility that a stress concentration will occur in the bending portion.

Solution to Problem

A mobile terminal with a flexible display according to a first aspect of the disclosure includes a first housing with one end side of a flexible display fixed to the first housing, and a second housing with the other end side of the flexible display fixed to the second housing. The first housing includes a first hinge, and the second housing includes a second hinge configured to fit together with the first hinge in order to allow the flexible display to fold between the first housing and the second housing. The first housing includes a cutout portion configured to form a space for permitting bulging of a bending portion of the flexible display that is folded.

Advantageous Effects of Disclosure

According to an aspect of the disclosure, it is possible to reduce a stress concentration in a bending portion of a flexible display folded between a first housing and a second housing.

BRIEF DESCRIPTION OF DRAWINGS

FIGS. 5A and 5B are plan views illustrating a configuration example of the hinge shaft provided to the mobile terminal with a flexible display.

DESCRIPTION OF EMBODIMENTS

First Embodiment

Configuration of Mobile Terminal 100 with Flexible Display

Figure 1:
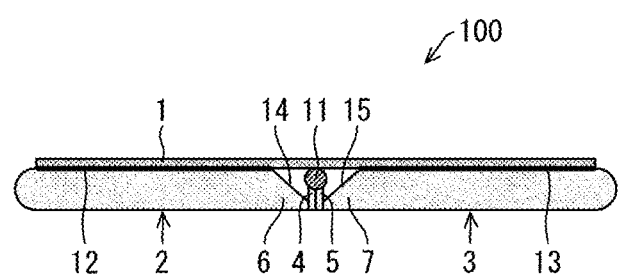
FIG. 1 is a schematic view illustrating an open state of a mobile terminal with a flexible display according to a first embodiment.

FIG. 1 is a schematic view illustrating an open state of a mobile terminal 100 with a flexible display according to the first embodiment. The mobile terminal 100 with a flexible display (hereinafter, referred to as "mobile terminal") includes a flexible display 1. One end side of the flexible display 1 is fixed to a surface of a first housing 2 having a plate shape with an adhesive 12 interposed therebetween while covering the surface of the first housing 2. The other end side of the flexible display 1 is fixed to a surface of a second housing 3 having a plate shape with an adhesive 13 interposed therebetween while covering the surface of the second housing 3.

A cutout portion 6 provided with an inclined surface 14 having a height that decreases toward the second housing 3 is provided on the second housing 3 side of the first housing 2. A space is formed between the inclined surface 14 and the flexible display 1 by the cutout portion 6.

A cutout portion 7 provided with an inclined surface 15 having a height that decreases toward the first housing 2 is provided on the first housing 2 side of the second housing 3. A space is formed between the inclined surface 15 and the flexible display 1 by the cutout portion 7.

The portion of the flexible display 1 facing the spaces is not fixed to the first housing 2 and the second housing 3.

A first hinge 4 is provided to a tip of the cutout portion 6, protruding toward the flexible display 1. The first hinge 4 includes a hinge shaft 11 at a leading end of the first hinge 4.

A second hinge 5 is provided to a tip of the cutout portion 7, protruding toward the flexible display 1. A leading end of the second hinge 5 fits together with the hinge shaft 11.

A state in which the flexible display 1 is thus unfolded and adhesively fixed on the first housing 2 and the second housing 3 is called an open state. In this open state, a size of a display screen can increase to approximately two times that of the surface of the first housing 2 or the surface of the second housing 3.

The flexible display 1 is not particularly limited to a specific display, as long as it is a display panel that has flexibility, and is provided with a bendable optical element. The optical element is an optical element whose luminance and transmittance are controlled by an electric current, and examples of the electric current-controlled optical element include an organic Electro Luminescence (EL) display provided with an Organic Light Emitting Diode (OLED), an EL display such as an inorganic EL display provided with an inorganic light emitting diode, or a QLED display provided with a Quantum dot Light Emitting Diode (QLED).

Action of Mobile Terminal 100

Figure 2:
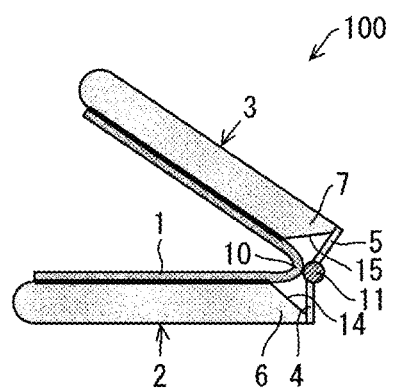
FIG. 2 is a schematic view illustrating an action of transitioning the mobile terminal with a flexible display from the open state to a closed state.
Figure 3:
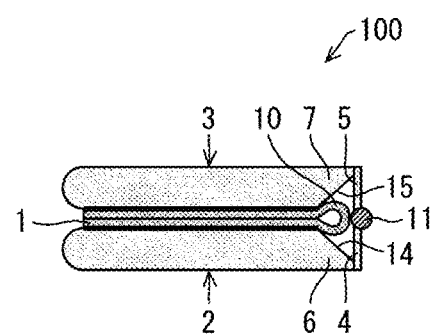
FIG. 3 is a schematic view illustrating the closed state of the mobile terminal with a flexible display.

FIG. 2 is a schematic view illustrating an action of transitioning the mobile terminal 100 from the open state to a closed state. FIG. 3 is a schematic view illustrating the closed state of the mobile terminal 100.

First, from the open state illustrated in FIG. 1, the second housing 3 is manually rotated counterclockwise about the hinge shaft 11, as illustrated in FIG. 2. As a result, the flexible display 1 adhesively fixed to the first housing 2 and the second housing 3 curves.

Then, the second housing 3 is further manually rotated counterclockwise about the hinge shaft 11, bringing the second housing 3 parallel with the first housing 2, as illustrated in FIG. 3. As a result, the flexible display 1 is folded between the first housing 2 and the second housing 3.

At this time, a bulging caused by the elastic deformation of a bending portion 10 of the flexible display 1 thus folded can be accommodated in the spaces formed by the inclined surface 14 of the cutout portion 6 and the inclined surface 15 of the cutout portion 7. Thus, a bending radius of the bending portion 10 of the flexible display 1 folded between the first housing 2 and the second housing 3 increases. Accordingly, it is possible to reduce a stress concentration in the bending portion 10 of the folded flexible display 1. As a result, a surface of one end side and a surface of the other end side of the flexible display 1 can be brought into contact with each other and compactly folded while preventing an inward folding of the bending portion 10 of the flexible display 1 folded between the first housing 2 and the second housing 3.

Figure 4:
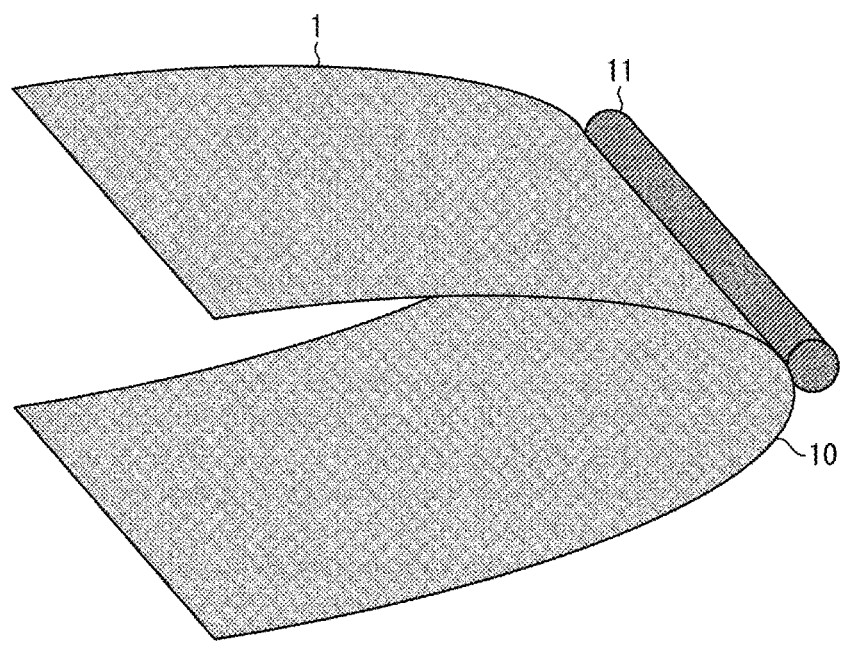
FIG. 4 is a schematic view for describing a relationship between a hinge shaft provided to the mobile terminal with a flexible display, and the flexible display.

FIG. 4 is a schematic view for describing a relationship between the hinge shaft 11 and the flexible display 1. When the flexible display 1 transitions from the open state to the closed state as illustrated in FIG. 2, the bending portion 10 of the flexible display 1 preferably acts so as to come into contact with the hinge shaft 11, as illustrated in FIG. 2 and FIG. 4.

With such an action, a force that regulates a free action of the bending portion 10 is applied to the bending portion 10 from the external hinge shaft 11, and the rigidity of the bending portion 10 is improved. Accordingly, the flexible display 1 is prevented from closing in a state where the bending portion 10 has a small radius of curvature. Further, the hinge shaft 11 comes into contact with the bending portion 10, promoting the deformation of the bending portion 10 in the space into a spindle shape having a large radius of curvature (as viewed from a side surface direction of the flexible display 1). The same applies to the embodiments described later.

The hinges 4, 5 each have an extendable structure in the protruding direction and are adjusted to the shortest length in the open state illustrated in FIG. 1 and to the longest length in the closed state illustrated in FIG. 3.

The cutout portion 6 and the cutout portion 7 are both preferably formed. However, one of the cutout portion 6 and the cutout portion 7 is preferably formed so as to permit the bulging of the bending portion 10 caused by elastic deformation.

The first housing 2 and the second housing 3 are preferably formed manually rotatable about the hinge shaft 11. However, a mechanism allowing the selection of a rotatable state and a rotation-inhibited state may be provided. For example, the hinge shaft 11 may include a cylindrical member and a shaft-like member formed so as to be insertable into the cylindrical member, and a mechanism may be provided that, when the shaft-like member is pushed into the cylindrical member, the shaft-like member moves to a position that permits the rotation of the second hinge 5, resulting in the selection of the rotatable state, and, when the shaft-like member is returned from the cylindrical member, the shaft-like member moves to a position inhibiting the rotation of the second hinge 5, resulting in the selection of the rotation-inhibited state. An inner peripheral cross section of the cylindrical member described above may be formed into a polygonal shape, and an outer peripheral cross section of the shaft-like member may be formed into a corresponding polygonal shape.

FIGS. 5A and 5B are plan views illustrating a configuration example of the hinge shaft 11 provided to the mobile terminal 100. The hinge shaft 11 includes a first tubular member 19 and a second tubular member 20 disposed separated from each other on a common axial center. A first fitting hole 21 is formed along an axial center in the first tubular member 19, and a second fitting hole 22 is formed along an axial center in the second tubular member 20.

A fitting shaft member 16 is provided on a leading end of the second hinge 5. A first projecting member 17 capable of sliding along an inner peripheral surface of the fitting shaft member 16 is provided on the first tubular member 19 side of the fitting shaft member 16 so as to be urged toward the first tubular member 19 and protrude from the fitting shaft member 16. Then, a second projecting member 18 capable of sliding along the inner peripheral surface of the fitting shaft member 16 is provided on the second tubular member 20 side of the fitting shaft member 16 so as to be urged toward the second tubular member 20 and protrude from the fitting shaft member 16. Tips of the first projecting member 17 and the second projecting member 18 are formed into hemispherical shapes.

The fitting shaft member 16 is inserted between the first tubular member 19 and the second tubular member 20.

When the fitting shaft member 16 is inserted, the first projecting member 17 and the second projecting member 18 are each recessed into an interior of fitting shaft member 16 against the urging force thereof. Subsequently, the first projecting member 17 protrudes along the first fitting hole 21 of the fitting shaft member 19, and the second projecting member 18 protrudes along the second fitting hole 22 of the second tubular member 20 to fit the fitting shaft member 16 together with the hinge shaft 11.

Modification

Figure 6A:
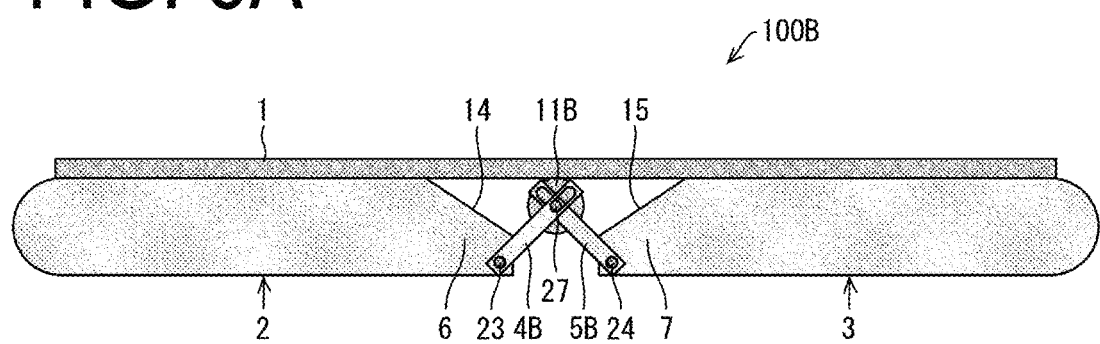
FIG. 6A is a schematic view illustrating an open state of a mobile terminal with a flexible display according to a modified example of the first embodiment.
Figure 6B:
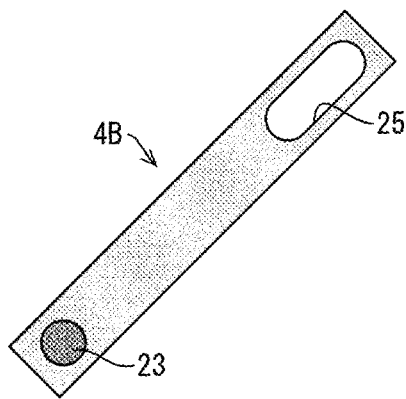
FIG. 6B is a front view of a first hinge provided to the mobile terminal.
Figure 6C:
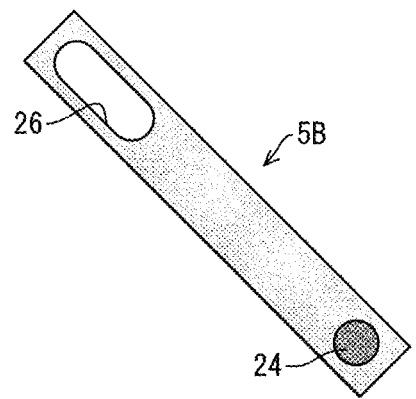
FIG. 6C is a front view of a second hinge provided to the mobile terminal.

FIG. 6A is a schematic view illustrating an open state of a mobile terminal 100B according to a modified example of the first embodiment, FIG. 6B is a front view of a first hinge 4B provided to the mobile terminal 100B, and FIG. 6C is a front view of a second hinge 5B provided to the mobile terminal 100B. The constituent elements that are the same as those described above are denoted using the same reference numbers. Detailed descriptions of these constituent elements are not repeated.

The first hinge 4B is provided to the tip of the cutout portion 6 of the first housing 2, protruding in a diagonal direction toward the flexible display 1. The first hinge 4B is rotatably provided about a rotating shaft 23 provided to the tip of the cutout portion 6. A long hole 25 extending in a radial direction of the rotating shaft 23 is formed on a leading end side of the first hinge 4B.

The second hinge 5B is provided to the tip of the cutout portion 7 of the second housing 3, protruding in a diagonal direction toward the flexible display 1. The second hinge 5B is rotatably provided about a rotating shaft 24 provided to the tip of the cutout portion 7. A long hole 26 extending in a radial direction of the rotating shaft 24 is formed on a leading end side of the second hinge 5B.

A hinge shaft 11B having a substantially cylindrical shape is provided to the mobile terminal 100B. The hinge shaft 11B includes a pin 27 protruding in an axial direction so as to fit in the long hole 25 of the first hinge 4B and the long hole 26 of the second hinge 5B.

Figure 7:
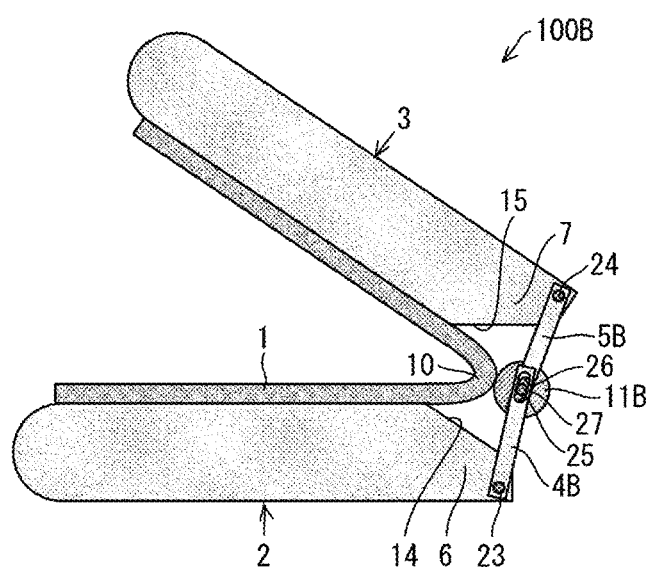
FIG. 7 is a schematic view illustrating an action of transitioning the mobile terminal with a flexible display from the open state to a closed state.
Figure 8A:
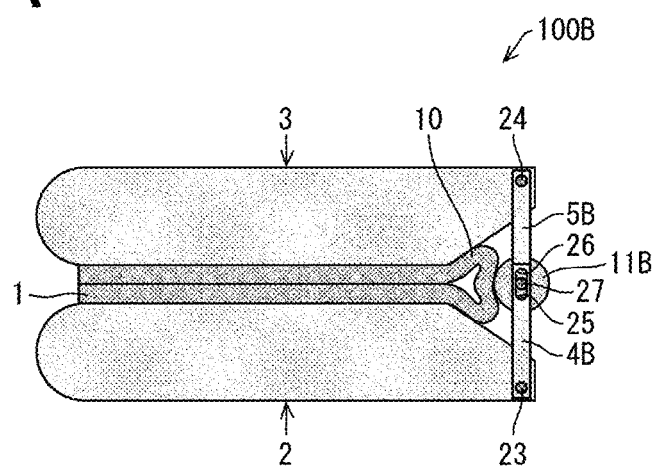
FIG. 8A is a schematic view illustrating the closed state of the mobile terminal with a flexible display.
Figure 8B:
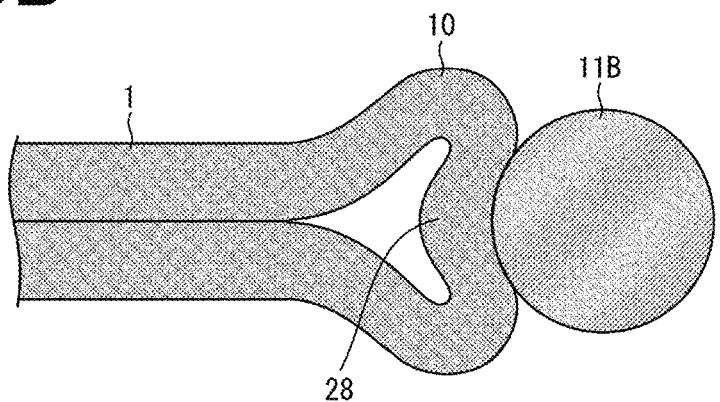
FIG. 8B is a drawing schematically illustrating a relationship between a hinge shaft provided to the mobile terminal and a bending portion of the flexible display.

FIG. 7 is a schematic view illustrating an action of transitioning the mobile terminal 100B from the open state to the closed state. FIG. 8A is a schematic view illustrating the closed state of the mobile terminal 100B, and FIG. 8B is a drawing schematically illustrating a relationship between the hinge shaft 11B provided to the mobile terminal 100B and the bending portion 10 of the flexible display 1.

First, from the open state illustrated in FIG. 6A, the second housing 3 is manually rotated counterclockwise about the hinge shaft 11B, as illustrated in FIG. 7.

At this time, the first hinge 4B rotates counterclockwise about the rotating shaft 23. Then, the second hinge 5B rotates clockwise about the rotating shaft 24. The pin 27 of the hinge shaft 11B slides into the long hole 25 of the first hinge 4B, in the leading end direction of the first hinge 4B, and slides in the long hole 26 of the second hinge 5B, in the leading end direction of the second hinge 5B. The hinge shaft 11B maintains contact with the bending portion 10 of the flexible display 1.

As a result, the flexible display 1 adhesively fixed to the first housing 2, and the second housing 3 curves.

Then, the second housing 3 is further manually rotated counterclockwise about the hinge shaft 11B, bringing the second housing 3 parallel with the first housing 2, as illustrated in FIG. 8A. As a result, the flexible display 1 is folded between the first housing 2 and the second housing 3.

An arc portion 28 recessed into an arc shape at the location in contact with the hinge shaft 11B is formed on the bending portion 10 of the flexible display 1, as illustrated in FIG. 8B. With such an arc portion 28 thus formed, it is possible to further increase the rigidity of the bending portion 10, prevent free deformation of the bending portion 10, and prevent the stress concentration.

Second Embodiment

Configuration of Mobile Terminal 100A

Figure 9:
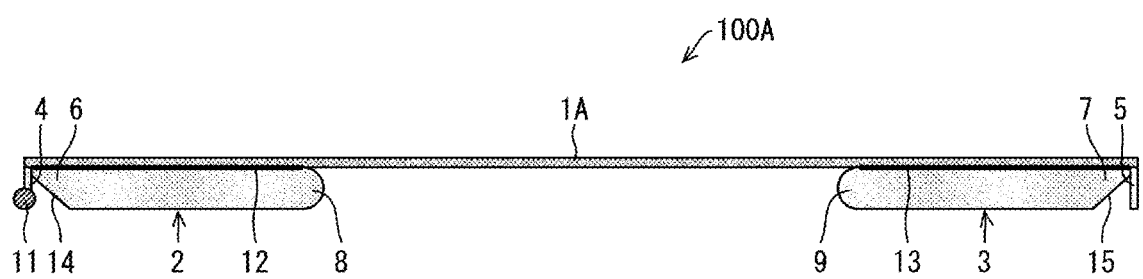
FIG. 9 is a schematic view illustrating an open state of a mobile terminal with a flexible display according to a second embodiment.

FIG. 9 is a schematic view illustrating an open state of a mobile terminal 100A according to the second embodiment. The constituent elements that are the same as those described above in the first embodiment are denoted using the same reference numbers. Detailed descriptions of these constituent elements are not repeated.

The mobile terminal 100A includes a flexible display 1A larger than the flexible display 1 described above in the first embodiment. One end side of the flexible display 1A is fixed to the surface of the first housing 2 having a plate shape with the adhesive 12 interposed therebetween. The other end side of the flexible display 1A is fixed to the surface of the second housing 3 having a plate shape with the adhesive 13 interposed therebetween. The first housing 2 and the second housing 3 are disposed in positions separated from each other.

The cutout portion 6 provided with the inclined surface 14 having a height that increases toward the second housing 3 is provided on a side of the first housing 2 opposite to the second housing 3. The inclined surface 14 is disposed on a side of the cutout portion 6 opposite to the flexible display 1A.

The first hinge 4 is provided to the tip of the cutout portion 6, protruding in a direction away from the flexible display 1A. The first hinge 4 includes the hinge shaft 11 at the leading end of the first hinge 4.

The cutout portion 7 provided with the inclined surface 15 having a height that increases toward the first housing 2 is provided on a side of the second housing 3 opposite to the first housing 2. The inclined surface 15 is disposed on a side of the cutout portion 7 opposite to the flexible display 1A.

The first housing 2 includes an end portion 8 having a cross section in an arc shape on the second housing 3 side. The second housing 3 includes an end portion 9 having a cross section in an arc shape on the first housing 2 side.

A state in which the flexible display 1A is thus fully unfolded and adhesively fixed on the first housing 2 and the second housing 3 is called a fully open state (an open state).

Action of Mobile Terminal 100A

Figure 10:
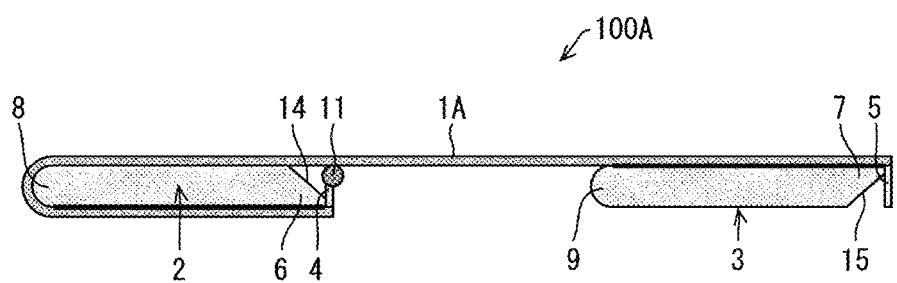
FIG. 10 is a schematic view illustrating a first half-open state of the mobile terminal with a flexible display.
Figure 11:
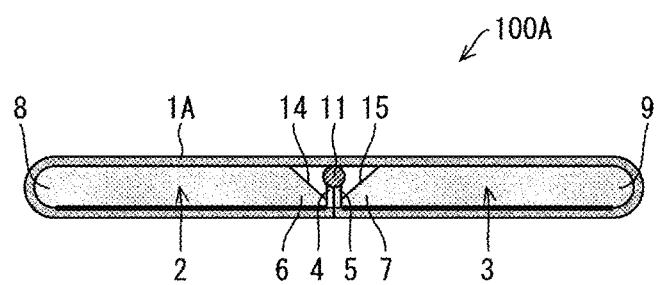
FIG. 11 is a schematic view illustrating a second half-open state of the mobile terminal with a flexible display.
Figure 12:
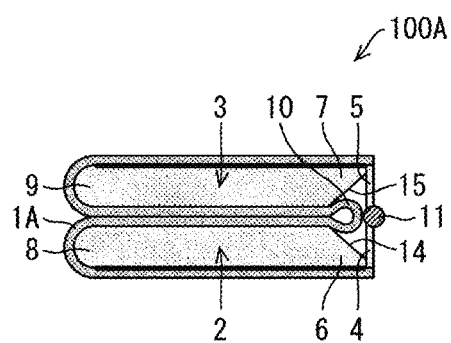
FIG. 12 is a schematic view illustrating a closed state of the mobile terminal with a flexible display.

FIG. 10 is a schematic view illustrating a first half-open state of the mobile terminal 100A. FIG. 11 is a schematic view illustrating a second half-open state of the mobile terminal 100A. FIG. 12 is a schematic view illustrating a closed state of the mobile terminal 100A.

First, from the fully open state illustrated in FIG. 9, the first housing 2 is rotated 180 degrees counterclockwise about the end portion 8 so that the flexible display 1A is wrapped around the first housing 2. As a result, the first hinge 4 is disposed on the second housing 3 side of the first housing 2, as illustrated in FIG. 10. Thus, the flexible display 1A transitions from the fully open state to the partially unfolded first half-open state.

From this first half-open state, the second housing 3 is rotated 180 degrees clockwise about the end portion 9 so that the flexible display 1A is wrapped around the second housing 3. As a result, the second hinge 5 is disposed on the first housing 2 side of the second housing 3 and is fit together with the hinge shaft 11, as illustrated in FIG. 11. Thus, the flexible display 1A transitions from the first half-open state to the second half-open state.

From this second half-open state, the second housing 3 is rotated 180 degrees counterclockwise about the hinge shaft 11. As a result, as illustrated in FIG. 12, the second housing 3 faces the first housing 2 with the bent flexible display 1A sandwiched therebetween. Thus, the flexible display 1A transitions from the second half-open state to the folded closed state.

At this time, a bulging caused by the elastic deformation of the bending portion 10 of the folded flexible display 1A can be accommodated in the spaces formed by the inclined surface 14 of the cutout portion 6 and the inclined surface 15 of the cutout portion 7. Thus, the bending radius of the bending portion 10 of the flexible display 1A folded between the first housing 2 and the second housing 3 increases. Accordingly, it is possible to reduce the stress concentration in the bending portion 10 of the folded flexible display 1A. As a result, a surface of one end side and a surface of the other end side of the flexible display 1A can be brought into contact with each other and compactly folded while preventing an inward folding of the bending portion 10 of the flexible display 1A folded between the first housing 2 and the second housing 3.

The cutout portion 6 and the cutout portion 7 are both preferably formed. However, one of the cutout portion 6 and the cutout portion 7 is preferably formed so as to permit the bulging of the bending portion 10 caused by elastic deformation.

In the closed state illustrated in FIG. 12, information is displayed with a region of the flexible display 1A on the surface of the second housing 3 opposite to the first housing 2 serving as a display screen. Then, when the flexible display 1A is unfolded and transitions from the closed state illustrated in FIG. 12 to the second half-open state illustrated in FIG. 11, information is displayed with a region of the flexible display 1A from the surface of the first housing 2 closer to inclined surface 14 to the surface of the second housing 3 closer to the inclined surface 15 serving as the display screen. As a result, the surface area of the display screen is approximately twice the surface area of the display screen in the closed state.

Next, when the flexible display 1A is further unfolded and transitions from the second half-open state illustrated in FIG. 11 to the first half-open state illustrated in FIG. 10, information is displayed with a region of the flexible display 1A from the surface of the second housing 3 opposite to the inclined surface 15 to the surface of the first housing 2 closer to the inclined surface 14 serving as the display screen. As a result, the surface area of the display screen is approximately three times the surface area of the display screen in the closed state.

Subsequently, when the flexible display 1A is further unfolded and transitions from the first half-open state illustrated in FIG. 10 to the fully open state illustrated in FIG. 9, information is displayed with a region of the flexible display 1A from the surface of the first housing 2 opposite to the inclined surface 14 to the surface of the second housing 3 opposite to the inclined surface 15 serving as the display screen. As a result, the surface area of the display screen is approximately four times the surface area of the display screen in the closed state.

Thus, according to the second embodiment, the surface area of the display screen of the flexible display 1A can be increased to four times the surface area of the display screen with the flexible display 1A in the folded state.

Supplement

A mobile terminal with a flexible display according to a first aspect includes a first housing with one end side of a flexible display fixed to the first housing, and a second housing with the other end side of the flexible display fixed to the second housing. The first housing includes a first hinge and, the second housing includes a second hinge configured to fit together with the first hinge in order to allow the flexible display to fold between the first housing and the second housing. The first housing includes a cutout portion configured to form a space for permitting the bulging of a bending portion of the flexible display that is folded.

According to a second aspect, in an open state with the flexible display unfolded, the first hinge is disposed on a side of the first housing closer to the second housing, and the second hinge disposed on a side of the second housing closer to the first housing is configured to fit together with the first hinge.

According to a third aspect, the second housing includes a cutout portion configured to form a space for permitting the bulging of the bending portion.

According to a fourth aspect, in an open state with the flexible display unfolded, the first hinge is disposed on a side of the first housing opposite to the second housing, and the second hinge is disposed on a side of the second housing opposite to the first housing.

According to a fifth aspect, the flexible display is transitioned from the open state to a first half-open state where the flexible display is partially unfolded by rotating the first housing about an end portion closer to the second housing, causing the flexible display to wrap around the first housing, and thus disposing the first hinge on a side of the first housing closer to the second housing.

According to a sixth aspect, the flexible display is transitioned from the first half-open state to a second half-open state where the flexible display is partially unfolded by rotating the second housing about an end portion closer to the first housing, causing the flexible display to wrap around the second housing, and thus disposing the second hinge on a side of the second housing closer to the first housing.

According to a seventh aspect, the flexible display is transitioned from the second half-open state to a closed state where the flexible display is folded by rotating the second housing about a hinge shaft configured to fit the first hinge together with the second hinge, causing the second housing to face the first housing with the flexible display bent and sandwiched between the first housing and the second housing.

According to an eighth aspect, the flexible display further includes an optical element.

According to a ninth aspect, the first hinge includes a hinge shaft configured to fit together with the second hinge, and the hinge shaft comes into contact with the bending portion while the flexible display is transitioned from the open state where the flexible display is unfolded to a closed state where the flexible display is folded.

According to a tenth aspect, the bending portion includes an arc portion recessed into an arc shape by contact with the hinge shaft.

According to an eleventh aspect, the first hinge and the second hinge are provided protruding toward the flexible display in the open state where the flexible display is unfolded, and the first hinge and the second hinge are extendably configured in a protruding direction.

According to the twelfth aspect, the first hinge is rotatably provided about a first rotating shaft of the first housing, the second hinge is rotatably provided about a second rotating shaft of the second housing, the first hinge includes a first long hole formed in the protruding direction, the second hinge includes a second long hole formed in the protruding direction, and the first hinge includes a hinge shaft including a pin configured to slidably fit in the first long hole and the second long hole.

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST

1 Flexible display
2 First housing
3 Second housing
4 First hinge
5 Second hinge
6, 7 Cutout portion
8, 9 End portion
10 Bending portion
11 Hinge shaft
100 Mobile terminal with flexible display
23 Rotating shaft (first rotating shaft)
24 Rotating shaft (second rotating shaft)
25 Long hole (first long hole)
26 Long hole (second long hole)
27 Pin
28 Arc portion

The invention claimed is:

1. A mobile terminal with a flexible display comprising:
   a first housing with one end side of a flexible display fixed to the first housing; and
   a second housing with the other end side of the flexible display fixed to the second housing,
   wherein the first housing includes a first hinge,
   the second housing includes a second hinge configured to fit together with the first hinge in order to allow the flexible display to fold between the first housing and the second housing,
   the first housing includes a cutout portion configured to form a space for permitting bulging of a bending portion of the flexible display that is folded,
   in an open state with the flexible display unfolded, the first hinge is disposed on a side of the first housing opposite to the second housing, and the second hinge is disposed on a side of the second housing opposite to the first housing, and
   in a closed state with the flexible display folded, the first hinge and the second hinge are aligned with each other to be perpendicular to a plate-shaped surface of the flexible display.

2. The mobile terminal with a flexible display according to claim 1,
   wherein the second housing includes a cutout portion configured to form a space for permitting the bulging of the bending portion.

3. The mobile terminal with a flexible display according to claim 1,
   wherein the flexible display is transitioned from the open state to a first half-open state where the flexible display is partially unfolded by rotating the first housing about an end portion closer to the second housing, causing the flexible display to wrap around the first housing, and thus disposing the first hinge on a side of the first housing closer to the second housing.

4. The mobile terminal with a flexible display according to claim 3,
   wherein the flexible display is transitioned from the first half-open state to a second half-open state where the flexible display is partially unfolded by rotating the second housing about an end portion closer to the first housing, causing the flexible display to wrap around the second housing, and thus disposing the second hinge on a side of the second housing closer to the first housing.

5. The mobile terminal with a flexible display according to claim 4,
   wherein the flexible display is transitioned from the second half-open state to a closed state where the flexible display is folded by rotating the second housing about a hinge shaft configured to fit the first hinge together with the second hinge, causing the second housing to face the first housing with the flexible display bent and sandwiched between the first housing and the second housing.

6. The mobile terminal with a flexible display according to claim 1,
   wherein the flexible display further includes an optical element.

7. The mobile terminal with a flexible display according to claim 1,
   wherein the first hinge includes a hinge shaft configured to fit with the second hinge, and
   the hinge shaft comes into contact with the bending portion while the flexible display is transitioned from the open state where the flexible display is unfolded to a closed state where the flexible display is folded.

8. The mobile terminal with a flexible display according to claim 7,
   wherein the bending portion includes an arc portion recessed into an arc shape by contact with the hinge shaft.

9. A mobile terminal with a flexible display comprising:
   a first housing with one end side of a flexible display fixed to the first housing; and
   a second housing with the other end side of the flexible display fixed to the second housing,
   wherein the first housing includes a first hinge,
   the second housing includes a second hinge configured to fit together with the first hinge in order to allow the flexible display to fold between the first housing and the second housing,
   the first housing includes a cutout portion configured to form a space for permitting bulging of a bending portion of the flexible display that is folded,
   in an open state with the flexible display unfolded, the first hinge and the second hinge are provided protruding toward the flexible display,
   the first hinge and the second hinge are extendably configured in a protruding direction, and
   in a closed state with the flexible display folded, the first hinge and the second hinge are aligned with each other to be perpendicular to a plate-shaped surface of the flexible display.

10. The mobile terminal with a flexible display according to claim 9,
    wherein the first hinge is rotatably provided about a first rotating shaft of the first housing,
    the second hinge is rotatably provided about a second rotating shaft of the second housing, the first hinge includes a first long hole formed in the protruding direction, the second hinge includes a second long hole formed in the protruding direction, and the first hinge includes a hinge shaft including a pin configured to slidably fit in the first long hole and the second long hole.

11. The mobile terminal with a flexible display according to claim 9, wherein the second housing includes a cutout portion configured to form a space for permitting the bulging of the bending portion.

12. The mobile terminal with a flexible display according to claim 9, wherein the flexible display further includes an optical element.

13. The mobile terminal with a flexible display according to claim 9, wherein the first hinge includes a hinge shaft configured to fit together with the second hinge, and the hinge shaft comes into contact with the bending portion while the flexible display is transitioned from the open state where the flexible display is unfolded to a closed state where the flexible display is folded.

14. The mobile terminal with a flexible display according to claim 13, wherein the bending portion includes an arc portion recessed into an arc shape by contact with the hinge shaft.

15. A mobile terminal with a flexible display comprising:

a first housing with one end side of a flexible display fixed to the first housing; and a second housing with the other end side of the flexible display fixed to the second housing, wherein the first housing includes a first hinge, the second housing includes a second hinge configured to fit together with the first hinge in order to allow the flexible display to fold between the first housing and the second housing, the first housing includes a cutout portion configured to form a space for permitting bulging of a bending portion of the flexible display that is folded, the first hinge includes a hinge shaft configured to fit together with the second hinge, the hinge shaft comes into contact with the bending portion while the flexible display is transitioned from an open state where the flexible display is unfolded to a closed state where the flexible display is folded, the bending portion includes an arc portion recessed into an arc shape by contact with the hinge shaft, and in a closed state with the flexible display folded, the first hinge and the second hinge are aligned with each other to be perpendicular to a plate-shaped surface of the flexible display.

16. The mobile terminal with a flexible display according to claim 15, wherein, in an open state with the flexible display unfolded, the first hinge is disposed on a side of the first housing closer to the second housing, and the second hinge disposed on a side of the second housing closer to the first housing is configured to fit together with the first hinge.

17. The mobile terminal with a flexible display according to claim 15, wherein the second housing includes a cutout portion configured to form a space for permitting the bulging of the bending portion.

18. The mobile terminal with a flexible display according to claim 15, wherein the flexible display further includes an optical element.

* * * * *